United States Patent
Elonen et al.

(10) Patent No.: US 6,733,631 B2
(45) Date of Patent: May 11, 2004

(54) USING CENTRIFUGAL PUMPS IN THE FOAM PROCESS OF PRODUCING NON-WOVEN WEBS

(75) Inventors: Jorma Elonen, Jamsankoski (FI); Kay Rokman, Karhula (FI); Arto Koso, Karhula (FI); Juhani Jansson, Karhula (FI)

(73) Assignee: Ahlstrom Glassfibre Oy, Karhula (FI)

( * ) Notice: Subject to any disclaimer, the term of this patent is extended or adjusted under 35 U.S.C. 154(b) by 0 days.

(21) Appl. No.: 10/431,432

(22) Filed: May 8, 2003

(65) Prior Publication Data

US 2003/0192661 A1 Oct. 16, 2003

Related U.S. Application Data

(62) Division of application No. 08/944,405, filed on Oct. 6, 1997, now Pat. No. 6,562,193.

(30) Foreign Application Priority Data

Dec. 19, 1996 (FI) .................................................. 965110

(51) Int. Cl.[7] .............................. D21F 1/00; D21F 1/66
(52) U.S. Cl. ...................... 162/264; 162/289; 162/336; 162/381
(58) Field of Search ................................ 162/101, 146.1, 162/157.1, 157.2, 190, 212, 289, 336, 381; 96/170, 216; 55/338; 415/120, 169.1, 169.2; 95/261

(56) References Cited

U.S. PATENT DOCUMENTS

| | | |
|---|---|---|
| 3,494,824 A | 2/1970 | Roberts |
| 3,716,449 A | 2/1973 | Gatward et al. |
| 3,871,952 A | 3/1975 | Robertson |
| 3,938,782 A | 2/1976 | Robertson |
| 3,944,406 A | 3/1976 | Jagusch et al. |
| 4,435,193 A | 3/1984 | Gullichsen et al. |
| 4,476,886 A | 10/1984 | Niskanen et al. |
| 4,543,156 A | 9/1985 | Chesire et al. |
| 4,856,456 A | 8/1989 | Hillman et al. |
| 4,944,843 A | 7/1990 | Wallace et al. |

FOREIGN PATENT DOCUMENTS

| | | |
|---|---|---|
| EP | 0 481 746 | 4/1992 |
| SE | PCT/SE95/00848 | 7/1995 |
| WO | WO 962702 A1 | 2/1996 |

Primary Examiner—Peter Chin
(74) Attorney, Agent, or Firm—NIxon & Vanderhye, P.C.

(57) ABSTRACT

A non-woven web of fibrous material is produced using a moving foraminous element in the practice of the foam process. A first foam slurry of air, water, fibers and a surfactant is generated and centrifugally pumped into contact with the moving foraminous element. Substantially fiber-free foam is withdrawn from the foraminous element while forming a non-woven web of fibrous material on the foraminous element, and at least a part of the substantially fiber-free foam is used in the generation of the first foam slurry. Recycling is also typically practiced using a centrifugal pump, and the centrifugal pumps are preferably degassing pumps which remove some of the gas from the foam. By practicing the invention it is possible to produce fibrous webs using the foam process that are more than two meters wide, and at a forming speed of more than about 100 m/min (e.g. about 200–500 m/min).

8 Claims, 3 Drawing Sheets

USING CENTRIFUGAL PUMPS IN THE FOAM PROCESS OF PRODUCING NON-WOVEN WEBS

RELATED APPLICATION

This application is a divisional application of and claim priority to U.S. patent application Ser. No. 08/944,405, filed Oct. 6, 1999 now U.S. Pat. No. 6,562,193.

BACKGROUND AND SUMMARY OF THE INVENTION

The foam-laid process for forming non-woven fibrous webs is basically disclosed in U.S. Pat. Nos. 3,716,449, 3,871,952, and 3,938,782 (the disclosures of which are incorporated by reference herein). The foam-laid process has a number of advantages over the water-laid process that is most conventionally used for making synthetic or cellulose fiber webs. The invention relates to a method and assembly for implementing the foam-laid process so as to improve aspects thereof.

While the foam process has a number of advantageous over the water-laid process in the production of fibrous non-woven webs, one of the practical disadvantageous thereof that has limited its commercialization to particular types of foams, is the relatively narrow width of the webs that have been produced from the foam-laid process in the past (e.g. typically in the range of 1–1.5 meters), compared with the width of the web in typical paper machines using the water-laid process which can be more than ten meters. Also, the production speed of the foam process has in the past been typically significantly under 100 meters per minute.

The main limitation in the width of the web and speed of operation in prior art systems implementing the foam process has been the pumps used to implement the process. The pumps are positive displacement pumps, such as screw pumps, twin screw pumps, twin rotor pumps, or the like, which have limited pumping capacity. Some of these positive displacement pumps are relatively insensitive to the material being pumped and, therefore, operate well in the production of fiber and gas containing fluids, which are, of course, characteristic of the foam process and it is for that reason that they are used. However, some of these pumps are easily worn out, are expensive, and easily damaged. Consequently, if the production is to be increased (as by increasing the size of the web produced by increasing the width of the wire or other foraminous element to more than 1.5 meters) several pumps must be used in parallel. This increases the expense of the assembly dramatically, and also introduces the risk of one of the pumps becoming damaged and thereby shutting down the entire process to repair or replace the damaged pump.

Even in situations where the prior art recognizes, during the practice of the foam process, the desirability to remove gas, some sort of separate degassing structure is provided, and pumping is done utilizing a conventional positive displacement pump. For example, in FIG. 3 of U.S. Pat. No. 4,944,843 degassing is provided by a centrifugal separator, but the foam which is passed through the foraminous element and is being removed through a duct is pumped using a positive displacement pump.

According to the present invention, disadvantages discussed above in a conventional foam process are overcome in a simple yet effective manner. By utilizing centrifugal pumps to handle the foam slurries (whether containing fibers or not) it is possible to increase the width of the wire (or other foraminous element) to more than two meters, and to increase the forming speed to more than 100 meters per minute (e.g. about 200–500 meters per minute). However, most centrifugal pumps are unsuitable for pumping the type of slurries that are handled in the foam process according to the invention. However, the invention utilizes degassing centrifugal pumps which have been found, according to the present invention, to be effective in implementing the foam process. While degassing centrifugal pumps, such as shown in U.S. Pat. Nos. 4,435,193 and 4,476,886, and Canadian Patent 1,128,368, have been used for many years in the pumping of medium consistency (e.g. about 6–18% solids) liquid fibrous slurries during the production of paper pulp and the like, their use in pumping the type of slurries encountered in the implementation of the foam process has not heretofore been recognized as practical, or as a solution to the long-standing problems in implementation of the foam process as set forth above.

According to one aspect of the present invention, a method of producing a non-woven web of fibrous material using a moving foraminous element (such as a single wire, twin wire, or any other conventional foraminous element) is provided. The method comprises the following steps: (a) Generating a first foam slurry of air, water, fibers, and a surfactant. (b) Centrifugally pumping the first foam slurry, into contact with the moving foraminous element. (c) Withdrawing substantially fiber-free foam from the foraminous element, while forming a non-woven web of fibrous material on the foraminous element, And (d) recycling at least part of the substantially fiber-free foam from step (c) for use in the practice of step (a).

Step (d) is preferably practiced in part by Centrifugally pumping the foam. Preferably steps (b) and (d) are practiced by partially degassing the foam during centrifugal pumping thereof (e.g. using a degassing centrifugal pump as basically described in U.S. Pat. Nos. 4,435,193 and 4,476,886, and Canadian Patent 1,128,368.

Steps (a) through (d) are preferably practiced using a moving foraminous element more than two meters wide (e.g. 2.1–10- meters wide), to produce as the non-woven fibrous web a web more than two meters wide. Also, steps (a) through (d) are preferably practiced to produce the non-woven web at a forming speed of more than about 100 meters per minute (e.g. more than about 200 meters per minute, such as about 200–500 meters per minute). Preferably centrifugal pumps are the only pumps used to pump either fibrous foam slurry or substantially fiber-free foam slurry in the practice of steps (a) through (d).

According to another aspect of the present invention a foam process assembly for producing a non-woven fibrous web is also provided. The assembly comprises the following components: A moving foraminous element on which a non-woven web may be formed. A source of a first foam slurry of air, water, fibers, and a surfactant. A first centrifugal pump for pumping the first foam slurry into contact with the moving foraminous element to form a non-woven web of fibrous material thereon, while a substantially fiber-free foam passes through the foraminous element. And a recycling system which returns at least part of the substantially fiber-free foam passing through the foraminous element to the source of the first foam slurry.

The moving foraminous element may be any conventional foraminous element, such as a single or double wire. The source of the first foam slurry may comprise any conventional source, such as a mixer/pulper, and/or a wire pit, and foam nozzles are typically utilized to facilitate the generate of the foam after pumping and before the foam is brought into contact with the foraminous element. The recycling system typically includes the wire pit, various conduits, and a second centrifugal pump (preferably a degassing pump as described above), and the first centrifugal pump is also preferably a degassing pump. The recycling system may comprise any conventional components, however. The recycling system typically includes the wire pit and the second centrifugal pump substantially fiber-free foam from the wire pit to the mixer/pulper. The foraminous element is preferably more than two meters wide, so as to produce a non-woven web more than two meters wide.

According to yet another aspect of the present invention a method of using a degassing centrifugal pump is provided. The method comprises the step of: pumping a foam slurry including at least gas, water and a surfactant with the degassing centrifugal pump, while simultaneously removing some gas from the slurry, during the production of a non-woven fibrous web by the foam process of web production. This step is typically practiced by pumping a foam slurry also including about 0.2–2.5%, by weight, fibers, and also by pumping a substantially fiber-free foam.

It is the primary object of the present invention to simply, yet effectively, enhance the implementation of the foam process for producing non-woven webs, including to increase the practical web width and/or forming speed. This and other objects of the invention will become from an inspection of the detailed description of the invention and from the appended claims.

DETAILED DESCRIPTION OF THE DRAWINGS

Figure 1:
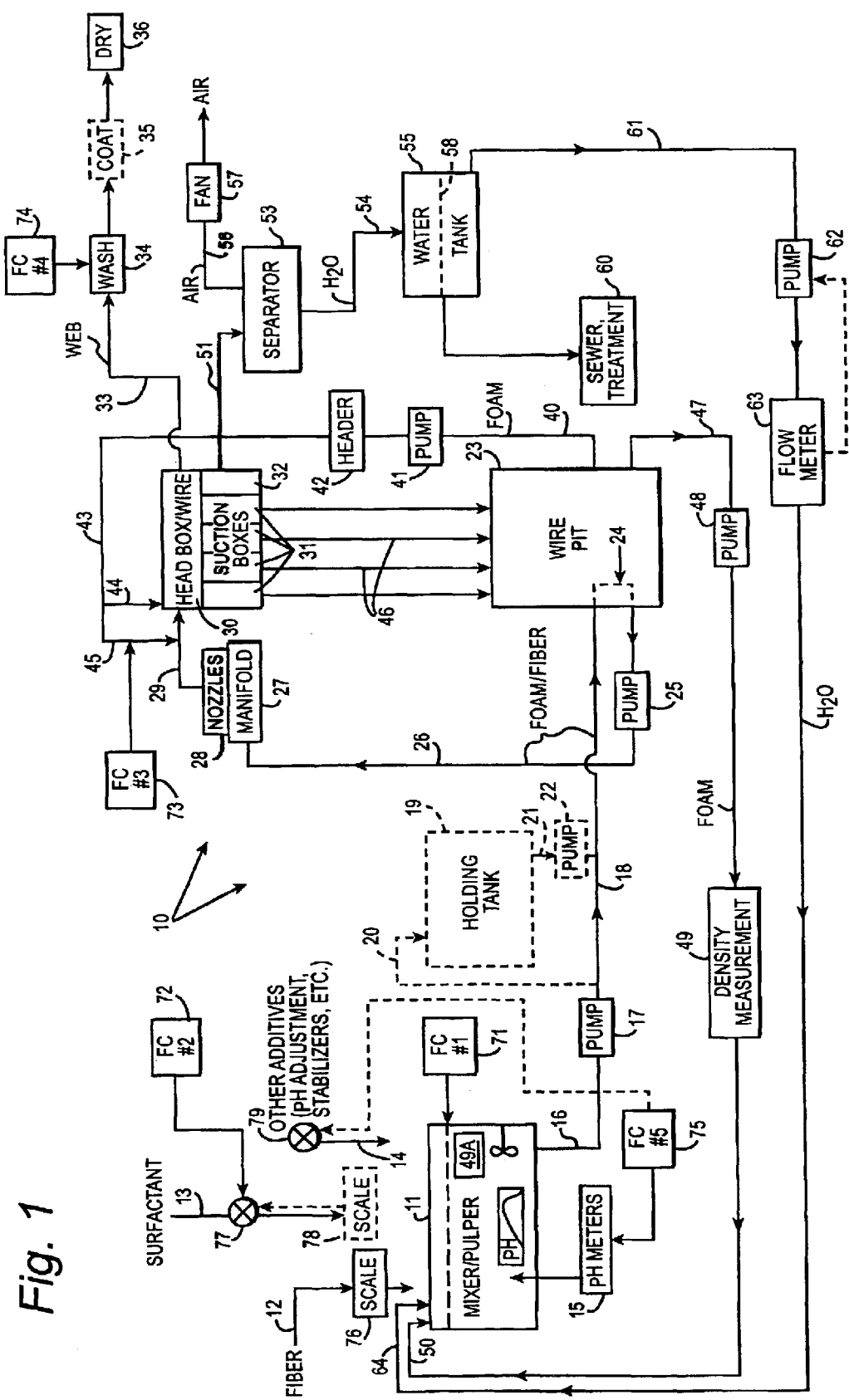
FIG. 1 is a general schematic illustration of a foam laid process system in which the method of the invention may be practiced and the apparatus of the invention utilized.

An exemplary foam-laid process system for practicing a foam laid process with which the invention is desirably utilized is illustrated schematically at 10 in FIG. 1. The system includes a mixing tank or pulper 11 having a fiber input 12, a surfactant input 13, and an input 14 for other additives, such as pH adjustment chemicals like calcium carbonate or acids, stabilizers, etc. The particular nature of the fibers (whether glass, synthetic, and/or cellulosic or natural), surfactant, and additives is not critical and they may be varied widely depending upon the exact details of the product being produced (including its basis weight). It is desirable to use a surfactant that can be fairly readily washed out since a surfactant reduces the surface tension of the final web if it is still present, and that is an undesirable feature for some products. The exact surfactant used, from the thousands that are commercially available, such as described generally in U.S. Pat. Nos. 3,716,449, 3,871,952, and 4,856,456, is not part of the present invention.

The tank 11 is per se entirely conventional, being the same type of tank that is used as a pulper in conventional paper making systems using the water-laid process. The only differences are that the side walls of the mixer/pulper 11 are extended upwardly about three times the height in the water-laid process since the foam has a density about a third that of water. The rpm and blade configuration of the conventional mechanical mixer in the tank 11 is varied depending upon the particular properties of the product being produced, but is not particularly critical, and a wide variety of different components and variables may be employed. Brakers may also be provided on the walls. There is a vortex at the bottom of the tank 11 from which the foam drains, but the vortex is not visible once start up occurs because the tank 11 is filled with foam and fiber.

The tank 11 also preferably includes therein a large number of pH meters 15 for measuring the pH at a number of different points. pH affects surface tension, and thus desirably is accurately determined. The pH meters are calibrated daily.

At initial start up, water is added with the fiber from line 12, the surfactant from line 13, and other additives in line 14; however, once operation commences no additional water is necessary and there is merely foam maintenance in the tank 11, not merely foam generation.

The foam exits the bottom of the tank 11, in a vortex, into line 16 under the influence of the pump 17. According to the invention, the pump 17, like all other pumps in the system 10, preferably is a degassing centrifugal pump. The foam discharged from the pump 7 passes in line 18 to further components.

FIG. 1 illustrates an optional holding tank 19 in dotted line. The holding tank 19 is not necessary but may be desirable to ensure a relatively even distribution of the fiber in the foam in case there is some variation that is introduced into the mixer 11. That is, the holding tank 19 (which is small, typically only on the order of five cubic meters) acts more or less like a "surge tank" for evening out fiber distribution. Because the total time from mixer 11 to the headbox (30) is typically only about 45 seconds in the practice of the process, the holding tank 19—if used—provides time for variations to even out.

When the holding tank 19 is used foam is fed from the pump 17 in line 20 to the top of the tank 19, and exits the bottom of the tank in line 21 under the influence of centrifugal pump 22, then leading to line 18. That is, when the holding tank 19 is used the pump 17 is not directly connected to the line 18, but only through the tank 19.

The line 18 extends to the wire pit 23. The wire pit 23 is per se a conventional tank, again the same as in the conventional water-laid paper process system, but with higher side walls. It is important to make the wire pit 23 so that there are no dead corners and therefore the tank 23 should not be too large. The conventional structure 24 which allows the foam and fiber mixture in line 18 to be introduced into the degassing centrifugal pump 25 (which is operatively connected adjacent the bottom of the wire pit 23) will be described further with respect to FIG. 2. In any event, the pump 25 pumps the foam/fiber mixture in line 18, introduced by mechanism 24, and additional foam from the wire pit 23, into the line 26. Because a fairly large amount of foam is drawn into the pump 25 from the wire pit 23, typically the consistency in line 26 is significantly less than that in line 18. The consistency in line 18 is typically between 2–5% solids (fibers), while that in line 26 is typically between about 0.2–2.5 (e.g. about 0.5–2.5%), although the consistency in each case may be as high as about 12%.

In the wire pit 23 there is no significant separation of the foam into layers of different density. While there is a minimal increase toward the bottom, that degree of increase is small and does not affect operation of the system.

From the line 26 the foam/fiber passes to the manifold 27 which has foam generating nozzles 28 associated therewith. Preferably the nozzles 28—which are conventional foam generating nozzles (which agitate the foam greatly) as used in the '449, '952 and '782 patents incorporated by reference herein—are mounted on the manifold 27, and a large number of the nozzles 28 are mounted on the manifold 27. Extending from each nozzle 28 is a conduit 29 which leads to the headbox 30, through which one or more conventional paper making wires, or any other suitable foraminous elements, pass.

The headbox 30 has a plurality of suction boxes (typically about three to five) 31 which withdraw foam from the opposite side of the wire (foraminous element) from the introduction of the foam/fiber mixture, and a final separation box 32 is at the discharge end of the formed web 33 from the headbox 30. The number of suction boxes 31 provided in the suction table to control drainage are increased for denser products, or for higher speed operation. The formed web 33, which typically has a solids consistency of about 40–60% (e.g. about 50%), is preferably subjected to a washing action as indicated schematically by wash stage 34 in FIG. 1. The wash stage 34 is to remove the surfactant. The high consistency of the web 33 means that a minimum amount of drying equipment need be utilized.

The web 33 passes from the washer 34 past one or more optional coaters 35, to the conventional drying station 36. In the conventional drying station 36 when synthetic sheath/core fibers (such as Cellbond) are part of the web 33, the dryer 34 is operated to raise the web above the melting point of the sheath material (typically polypropylene) while the core material (typically PET) does not melt. For example where a Cellbond fiber is used in the web 33, the temperature in the dryer is typically about 130° C. or slightly more, which is at or slightly above the melting temperature of the sheath fiber, but well below the approximately 250° C. melting temperature of the core fiber. In that way a binding action is provided by the sheath material, but the integrity of the product (provided by the core fiber) is not compromised.

While it is not necessary, the process also contemplates the possibility of adding pure foam to or immediately adjacent the headbox 30 for a number of advantageous purposes. As seen in FIG. 1, the centrifugal pump 41 draws foam from the wire pit 23 into line 40. The foam in line 40 is pumped to a header 42 which then distributes the foam to a large number of different conduits 43, toward the headbox 30. The foam may be introduced—as indicated by line 44—directly underneath the roof of the headbox 30 (where it is an incline wire headbox), and/or via conduits 45 to the lines 29 (or nozzles 28) for introducing foam/fiber mixture into the headbox 30.

The suction boxes 31 discharge the foam withdrawn from the headbox 30 in lines 46 into the wire pit 23. Typically no pumps are necessary, or used, for that purpose.

A significant amount of the foam in the wire pit 23 is recalculated to the pulper 11. The foam is withdrawn in line 47 by centrifugal pump 48, and then passes in conduit 47 through the conventional in-line density measurement device 49 for introduction—as indicated schematically at 50—back into the tank 11. In addition to providing density measurement for the foam in line 47 at 49, as schematically illustrated in FIG. 1 one or more density measuring units (such as denseometers) 49A may be mounted directly in the tank 11.

In addition to foam recycle, there is also typically water recycle. The foam withdrawn from the last suction box 32 passes via line 51 to a conventional separator 53, such as a cyclone separator. The separator 53—e.g. by vortex action—separates air and water from the foam introduced into the separator 53 to produce water with very little air in it. The separated water passes in line 54 from the bottom of the separator 53 to the water tank 55. The air separated by the separator 53 passes in line 56, with the assistance of the fan 57, from the top of the separator 53 and is discharged to atmosphere, or used in a combustion process or otherwise treated.

A liquid level 58 is established in the water tank 55, with some liquid overflowing to sewer or treatment, as indicated schematically at 60 in FIG. 1. Water is also taken from below the level 58 in the tank 55 via line 61, and under the influence of centrifugal pump 62 is pumped in line 61 through a conventional flow meter 63 (which controls the pump 62). Ultimately, the recycled water is introduced—as indicated schematically at 64 in FIG. 1—to the top of the mixer 11.

Typical flow rates are 4000 liters per minute foam/fiber in line 18, 40,000 liters per minute foam/fiber in line 26, 3500 liters per minute foam in line 47, and 500 liters per minute foam in line 51.

The system 10 also includes a number of control components. A preferred example of various alternatives for controlling the operation of the system comprises first fuzzy controller, 71, controls the level of foam in the tank 11. A second fuzzy controller 72 controls the addition of surfactant in line 13. A third fuzzy controller 73 controls web formation in the headbox 30 area. A fourth fuzzy controller 74 is used with the washer 34. A fifth fuzzy controller 75 controls the pH meters 15, and possibly controls addition of other additives in line 14 to the mixer 11. Fuzzy control is also used for surfactant and formation control. A multi-variable control system, and a Neuronet control system, also are preferably provided overlaying the other controls. The multi-variable control also is used for controlling the efflux ratio at web formation. The variables can be changed depending upon their effect on desired process regulation, and end result.

In order to facilitate control of the various components, typically a scale 76 is associated with the fiber introduction 12 in order to accurately determine the amount of fiber being added, per unit time. A valve 77 in line 13 may be provided for controlling the introduction of surfactant, as well as a scale 78. A valve 79 may also be provided in the line 14.

In the system 10 essentially no valves are provided for intentionally contacting the foam at any point during its handling, with the possible exception of level control valves provided in lines 46.

Also, during the entire practice of the process of the system of FIG. 1 the foam is kept under relatively high shear conditions. Since the higher the shear the lower the viscosity, it is desirable to maintain the foam at high shear. The foam/fiber mixture acts as a pseudo-plastic, exhibiting non-Newtonian behavior.

The use of the foam-laid process has a number of advantages compared to the water-laid process particularly for highly absorbent products. In addition to the reduced dryer capacity because of the high consistency of the web 33, the foam process allows even distribution of virtually any type of fiber or particle (without excessive "sinking" of high density particles while low density particles do "sink" somewhat—they do not sink at all in water) into the slurry (and ultimately the web) as long as the fibers or particles have a specific gravity between about 15-13. The foam process also allows the production of a wide variety of basis weight webs, a product with increased uniformity and higher bulk compared to water-laid process products, and a very high level of uniformity. A plurality of headboxes may be provided in sequence, or two (or more) strata may be made at the same time within a headbox with a double wire, etc., and/or the simple coaters 35 may be utilized to provide additional layers with great simplicity (like coating).

Figure 2:
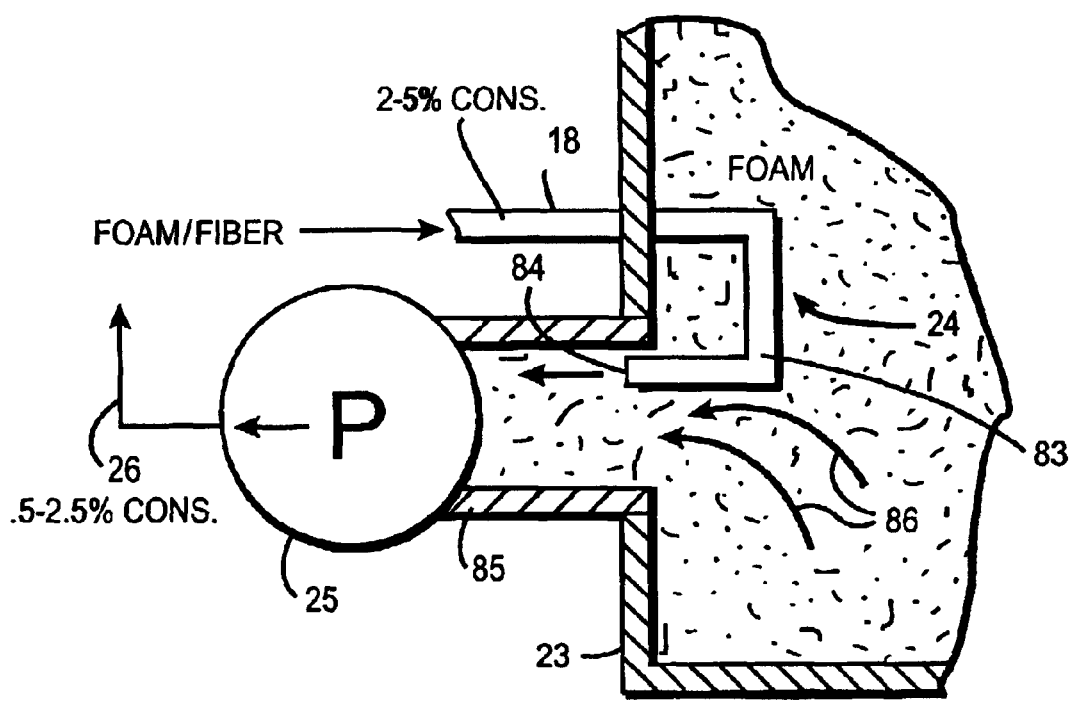
FIG. 2 is a detail schematic view, partly in cross-section and partly in elevation, showing the feed of a foam/fiber slurry from the mixer to the pump feeding the manifold and headbox of the system of FIG. 1.

FIG. 2 shows the introduction of foam/fiber mixture, and foam, to the centrifugal degassing pump 25 associated with the wire pit 23. The structure 24 is known from the Wiggins Teape process such as disclosed in the patents incorporated by reference herein, and the foam/fiber passing in line 18 is caused to be redirected as illustrated by the bent conduit 83 so that from the open end 84 thereof the foam/fiber mixture is discharged directly into the intake 85 of the pump 25. Foam from the wire pit 23 also flows into the inlet 85, as illustrated by arrows 86. Operation of pump 48, done under fuzzy control; controls the level in wire pit 23.

Where the fibers to be used to make the foam are particularly long, that is on the order of several inches, instead of directing the line 18 to the suction inlet 85 of the pump 25 (as seen in FIG. 2) the line 18 terminates in the line 26 downstream of the pump 25. In this case the pump 17 must of course provide a higher pressure than it otherwise would, that is sufficient pressure so that the flow from 18 is into the line 26 despite the pressure in line 26 from the pump 25.

Figure 3:
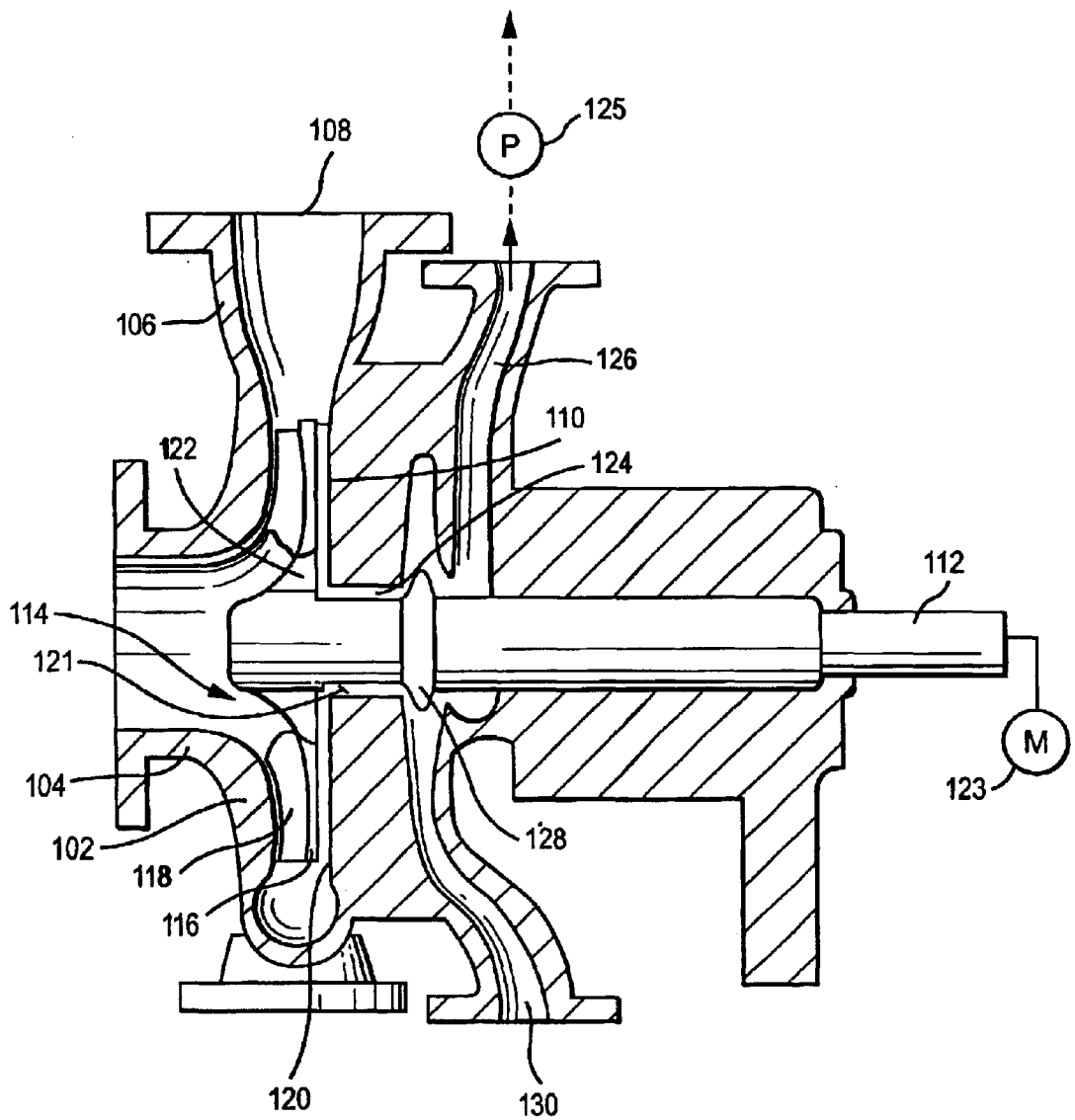
FIG. 3 is a side view, mostly in cross section, but partly in elevation, of an exemplary degassing centrifugal pump that is utilized in the practice of the present invention.

A typical degassing pump that may be used as any one or more of the pumps 17, 25, 41, 48, 62, according to the present invention, is shown generally by reference numeral 100 in FIG. 3, and is basically the same as a conventional MC® pump sold by Ahlstrom Machinery Inc. and Ahlstrom Machinery Oy, and shown in U.S. Pat. Nos. 4,435,193 and 4,476,886, and Canadian Patent 1,128,368.

The pump 100 typically comprises a conventional volute casing 102 with an axial inlet channel 104 and preferably a tangential discharge channel 106 with a pressure opening 108. Furthermore, the casing comprises a casing cover 110, having a central or rotatable shaft 112. Inside the volute casing 102 an impeller 114 is mounted on the shaft 112. The impeller 114 may comprise a substantially radial disc 116, on the front surface of which (on the inlet channel side) are working blades 118. Back vanes 120 are also provided on the back side of the impeller 114. One opening, or several openings, 122 extend through the disc 116, preferably close to the shaft 112. The gas accumulated in front of the impeller 114 flows through the opening(s) 122 to the volume 121 behind the impeller 114, i.e. to the volume 121 between the disc 116 and the casing cover 110 of the pump 100. The shaft 112 is rotated by any suitable power source, such as electric motor shown schematically at 123 in FIG. 3.

The casing cover 110 is also provided with an annular gas outlet channel 124 around the shaft 112, or special openings (not shown) in the casing cover 110 itself to remove the separated gas from the volume 121 behind the impeller 114. The gas outlet channel 124 (or openings) is connected to a suction device (illustrated only schematically at 125 in FIG. 3) which is used to create an underpressure necessary for gas removal. The suction device 125 is often a liquid ring pump, i.e., a Nash-pump (named after the traditional manufacturer of these pumps). The suction device 125 may be mounted on the same shaft (112) as the impeller 114, or provided as a separate operating device apart from the centrifugal pump 100. In FIG. 3 the suction device 125 is positioned separately from the pump 100, and thus the gas removal system from the pump 100 includes a channel 126 which is used to remove the gas or foam generated in the pump 100 to the suction device 125.

FIG. 3 also illustrates how in cases where a large amount of fibers are brought into the gas separation system, separating wheel 128 may be mounted in the gas separation system, which separating wheel 128 pumps the fibers in the gas flow, due to the operation of the back vanes 120 away from the pump 100 into conduit 130 so that the fibers do not enter the suction device 125. The wheel 128, or the like, is not usually necessary particularly in short circulation applications as hardly any fibers are caught up in the removed gas flow, and thus their damaging effect on the suction device 125 is almost nonexistent.

The pump 100 described above operates so that the material in the suction channel 104 of the pump 100 starts to rotate due to the effect of the impeller 114, so that the gas in the material is collected in front of the impeller 114 as a gas bubble. When the effect of the suction device 125 described above is directed through the gas outlet channel 124 or openings on the casing cover 110 of the casing to the volume 121 behind the impeller 114 and therefrom further through the openings 122 of the impeller 114 to the front side of the impeller 114, the gas in the bubble starts to flow in the direction of the suction device 125. The suction may in some exceptional occasions also start to pull liquid and even fibers into the volume 121. In such case the back vanes 120 of the impeller 114 are used to separate the liquid and/or fibers from the gas to form a separate flow which is then returned via the outer edge of the disc 116 to the main flow and to be removed through the pressure outlet 108 out of the pump 100.

Thus, it will be seen that as described above a foam process assembly for producing a non-woven fibrous web is provided. The foam process assembly includes a conventional moving foraminous element in the headbox 30 on which a non-woven web may be formed, and a source of a first foam slurry of air, water, fibers, and a surfactant. The source may comprise the mixer/pulper 11 and/or the wire pit 23. A first centrifugal pump (17 or 25) pumps the first foam slurry into contact with the moving foraminous element in headbox 30 to form a non-woven web, while a substantially fiber-free foam passes through the foraminous element. A recycling system, which may include the section boxes 31, wire pit 23, conduit 47, and second centrifugal degassing pump 48, returns at least part of the substantially fiber-free foam passing through the foraminous element to the source. For example, where the conduit 47 or pump 48 are used, they return part of the foam which passes through lines 46 into the wire pit 23 to mixer/pulper 11.

The pump 25 typically pumps the foam slurry, including fibers through the foam generating nozzles 28 into contact with the foraminous element in headbox 30, and need be the only pump for doing that. Because centrifugal pumps have much higher capacity than positive displacement pumps, the foraminous element may be more than two meters wide (e.g. 2.1 up to about ten meters wide) and still only a single pump 25 is necessary. Also, the use of a centrifugal pump, such as for pumps 25, 48, allows the forming speed to be increased significantly, compared to known foam process systems, to more than about 100 meters per minute, and in fact more than about 200 meters per minute (e.g. about 200–500 meters per minute).

In the practice of the method, and utilization of the system, according to the present invention, typical foam process parameters that may be utilized are set forth in the following table (although the range of parameters can be much wider if the product range is wider):

| PARAMETER | VALUE |
|---|---|
| pH (substantially entire system) | About 6.5 |
| temperature | About 20–40° C. |
| manifold pressure | 1–1.8 bar |
| consistency in mixer | 2.5% |
| consistency in headbox | .2–2.5% |
| SAP additive consistency | About 5–20% |
| consistency of formed web | About 40–60% |
| web basis weight variations | Less than ½% |
| foam density (with or without fibers) | 250–450 grams per liter at 1 bar |
| foam bubble size | .3–.5 mm average diameter (a Gaussian distribution) |
| foam air content | 25–75% (e.g. about 60%; changes with pressure in the process) process) |
| viscosity | there is no "target" viscosity, but typically the foam has viscosity on the order of 2–5 centipoises under high shear conditions, and 200 k–300 k centipoises at low shear conditions, which ranges may be wider depending on the manner of determining viscosity. |
| web formation speed | about 200–500 meters per minute |
| specific gravity of fibers or additives | anywhere in the range of .15–13 |
| surfactant concentration | depends on many factors, such as water hardness, pH, type of fibers, etc. Normally between 0.1–0.3% of water in circulation |
| forming wire tension | between 2–10 N/cm |
| exemplary flow rate | |
| mixer to wire pit | about 4000 liters per minute |
| wire pit to headbox | about 40,000 liters per minute |
| foam recycle conduit | about 3500 liters per minute |
| suction withdrawal to water recycle | about 500 liters per minute |

It is the primary object of the present invention to provide highly advantageous modifications of the foam-laid process. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and assemblies.

What is claimed is:

1. A foam process assembly for producing a non-woven web of fibrous material, comprising:

a moving foraminous element on which a non-woven web may be formed;

a source of a first foam slurry of air, water, fibers, and a surfactant a first degassing centrifugal pump for pumping the first foam slurry into contact with the moving foraminous element to form a non-woven web of fibrous material thereon, while a substantially fiber-free foam passes through the foraminous element; and a recycling system which returns at least part of the substantially fiber-free foam passing through the foraminous element to the source of the first foam slurry.

2. A foam process assembly as recited in claim 1 wherein said recycling system further comprises a second centrifugal pump.

3. A foam process assembly as recited in claim 1 wherein said first degassing centrifugal pump further comprises an axial inlet impeller in a volute casing having a tangential discharge channel.

4. A foam process assembly as recited in claim 2 wherein said second centrifugal pump is a degassing centrifugal pump.

5. A foam process assembly as recited in, claim 1 wherein said foraminous element is more than two meters wide, for producing a non-woven web more than two meters wide.

6. A foam process assembly as recited in claim 5 further comprising foam-generating nozzles located between said first centrifugal pump and said foraminous element, and wherein said first centrifugal pump pumps the first foam slurry through said foam-generating nozzles, and is of the only pump pumping the first foam slurry through said foam-generating nozzles.

7. A foam process assembly as recited in claim 1 wherein said source comprises a mixer/pulper, and a wire pit.

8. A foam process assembly as recited in claim 7 wherein said recycling system includes said wire pit, and a second centrifugal pump for pumping substantially fiber-free foam from said wire pit to said mixer/pulper.

* * * * *